US011092241B1

(12) United States Patent
Li et al.

(10) Patent No.: US 11,092,241 B1
(45) Date of Patent: Aug. 17, 2021

(54) MAGNETIC FLUID SEALING DEVICE

(71) Applicant: Tsinghua University, Beijing (CN)

(72) Inventors: Decai Li, Beijing (CN); Qian Li, Beijing (CN); Siyu Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/212,894

(22) Filed: Mar. 25, 2021

(30) Foreign Application Priority Data

Oct. 30, 2020 (CN) .......................... 202011194189.4

(51) Int. Cl.
*F16J 15/43* (2006.01)
(52) U.S. Cl.
CPC ..................................... *F16J 15/43* (2013.01)
(58) Field of Classification Search
CPC ........................................................ F16J 15/43
See application file for complete search history.

(56) References Cited

U.S. PATENT DOCUMENTS

| 4,440,402 A * | 4/1984 | Pinkus ..................... F16J 15/43 |
| | | 277/410 |
| 4,455,026 A * | 6/1984 | Pinkus ..................... F16J 15/43 |
| | | 277/301 |
| 4,527,802 A * | 7/1985 | Wilcock ................... F16J 15/42 |
| | | 277/302 |
| 5,474,302 A * | 12/1995 | Black, Jr. ................. F16J 15/43 |
| | | 277/410 |
| 6,899,338 B2 * | 5/2005 | Li ........................... F16J 15/43 |
| | | 277/302 |
| 2010/0025935 A1 * | 2/2010 | Helgeland ................ F16J 15/43 |
| | | 277/410 |
| 2013/0019827 A1 * | 1/2013 | Oka ....................... F16D 57/002 |
| | | 123/90.15 |

FOREIGN PATENT DOCUMENTS

KR   2019001640 A * 1/2019 ............... F16D 1/00

* cited by examiner

*Primary Examiner* — Vishal A Patel
(74) *Attorney, Agent, or Firm* — Hodgson Russ LLP

(57) ABSTRACT

A magnetic fluid sealing device is disclosed. The magnetic fluid sealing device includes a housing, a shaft, and a magnetic sealing member. The housing has a cavity containing a magnetic fluid. One end of the shaft extends out of the housing through a first through-hole. The outer peripheral face of the shaft is provided with liquid injection grooves with one end extending out of the housing. The magnetic sealing member is located within the sealing cavity and includes at least one magnetic source and a plurality of pole shoes. The plurality of pole shoes are arranged at intervals in a length direction of the housing. The magnetic source is connected between two adjacent pole shoes. A sealing gap in communication with the liquid injection groove is defined between the plurality of pole shoes and the shaft.

9 Claims, 9 Drawing Sheets

US 11,092,241 B1

MAGNETIC FLUID SEALING DEVICE

CROSS REFERENCE TO RELATED APPLICATION

The present application claims the benefit of and priority to Chinese Application No. 202011194189.4, filed on Oct. 30, 2020, the entire disclosures of which is incorporated herein by reference.

FIELD

The present disclosure relates to the field of sealing technology, and more particularly to a magnetic fluid sealing device.

BACKGROUND

The magnetic fluid sealing technology has advantages of zero leakage, strong reliability, simple structure, long service life, no wear, and recoverability, and is widely used in the industrial field. However, the injection of magnetic fluid in the magnetic fluid sealing technology is difficult, especially when the magnetic fluid needs to fill sealing gaps evenly and effectively.

SUMMARY

The present disclosure aims to solve at least one problem in the related art to a certain degree.

To this end, embodiments of the present disclosure provide a magnetic fluid sealing device that can directly inject a magnetic fluid into a sealing gap using a liquid injection groove, which allows the magnetic fluid to be injected conveniently and quickly and fill a sealing gap evenly and effectively.

The magnetic fluid sealing device according to the embodiments of the present disclosure includes: a housing, a shaft, and a magnetic sealing member. The housing is made of a magnetically non-conductive material and has a cavity, an end of the housing is provided with a first through-hole, the cavity includes a sealing cavity, and the sealing cavity contains magnetic fluid. The shaft is made of a magnetically conductive material, passes through the housing along an axial direction of the shaft, and is at least partially located within the cavity. The axial direction of the shaft is parallel to the length direction of the housing, an end of the shaft extends out of the housing through the first through-hole, and the outer peripheral face of the shaft is provided with liquid injection grooves. The length direction of the liquid injection grooves is parallel to the axial direction of the shaft, and an end of the liquid injection grooves extends out of the housing. The magnetic sealing member is located within the sealing cavity and includes at least one magnetic source and a plurality of pole shoes. The plurality of pole shoes are arranged at intervals along the length direction of the housing. The magnetic source is connected between two adjacent pole shoes. The outer peripheral face of each pole shoe is in contact with the inner peripheral face of the housing. The magnetic source and the pole shoes are sleeved over the shaft. A sealing gap is provided between the plurality of pole shoes and the shaft, and is in communication with the liquid injection grooves, and the magnetic fluid is e adsorbed in the sealing gap under the action of a magnetic force.

DETAILED DESCRIPTION

Embodiments of the present disclosure will be described in detail below, and examples of the embodiments will be illustrated in the accompanying drawings. The embodiments described herein with reference to the drawings are exemplary, and used to generally understand the present disclosure. The embodiments shall not be construed to limit the present disclosure.

Figure 1:
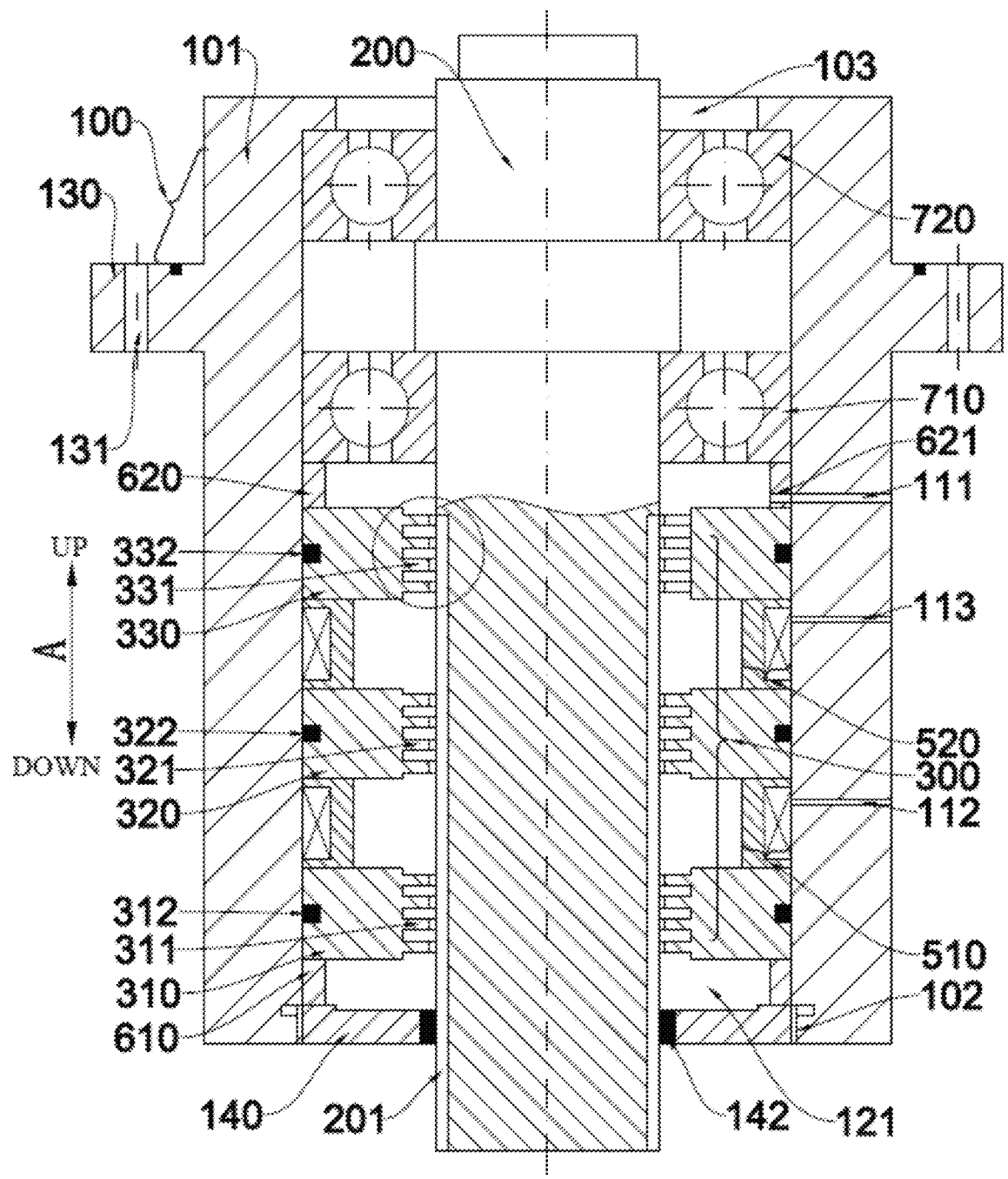
FIG. 1 is a schematic view of a magnetic fluid sealing device according an embodiment of the present disclosure.
Figure 2:
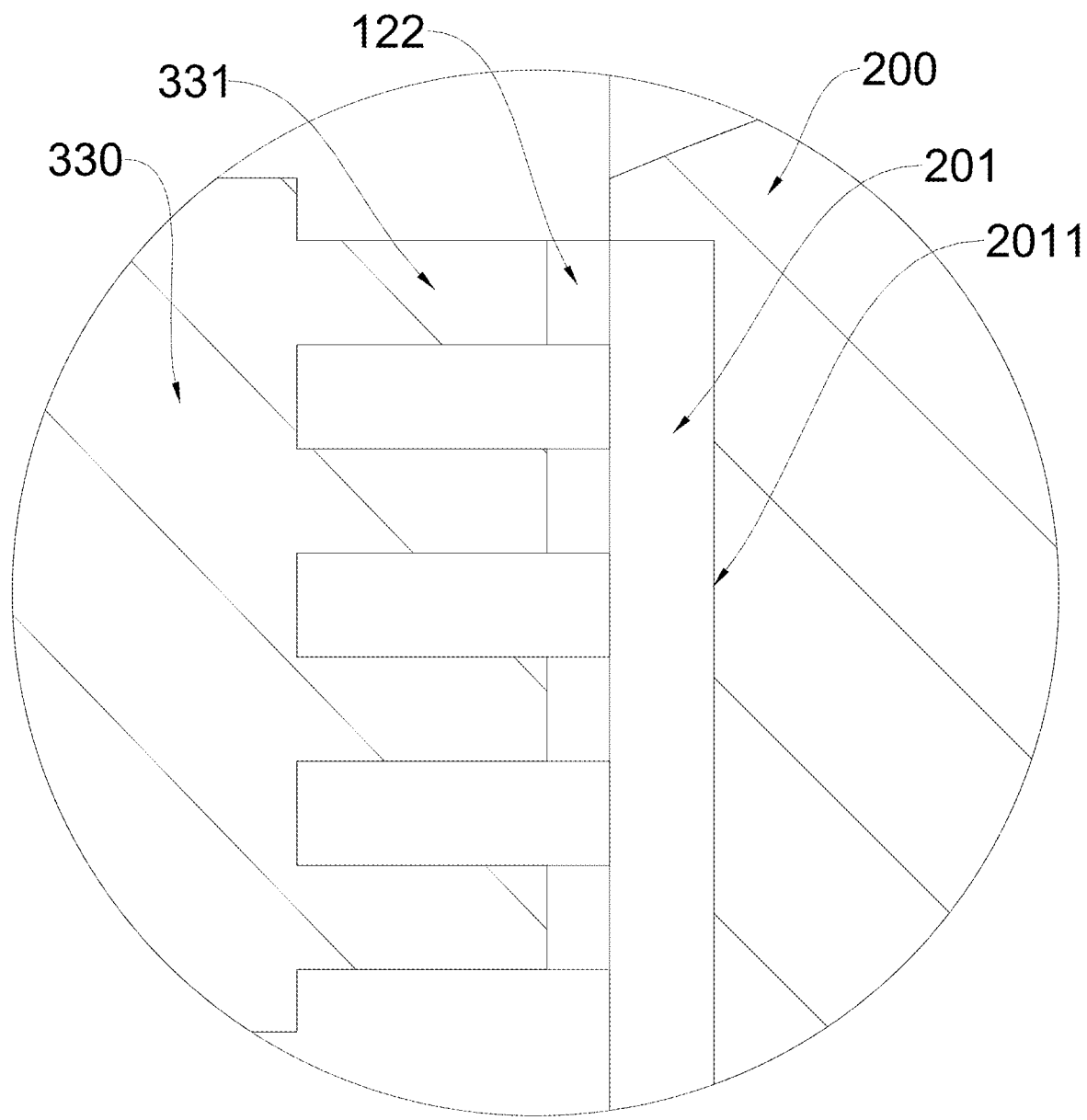
FIG. 2 is a partially enlarged view of FIG. 1.
Figure 3:
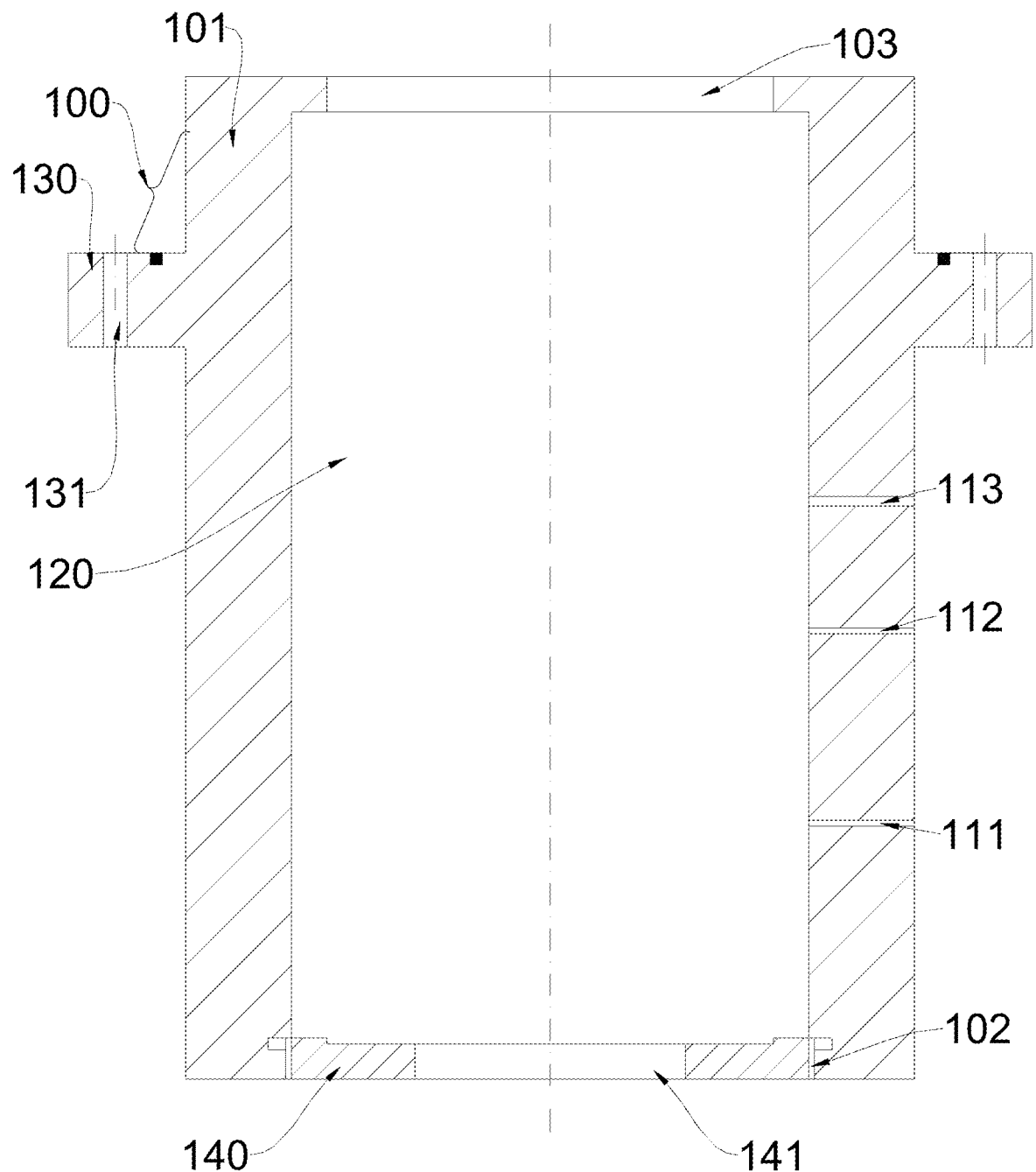
FIG. 3 is a schematic view of the housing of the magnetic fluid sealing device according to an embodiment of the present disclosure.

As illustrated in FIGS. 1 to 3, a magnetic fluid sealing device according to embodiments of the present disclosure includes a housing 100, a shaft 200, and a magnetic sealing member 300.

As illustrated in FIGS. 1 and 3, the material of the housing 100 is magnetically non-conductive. The housing 100 has a cavity 120 including a sealing cavity 121, and magnetic fluid 820 is filled in the sealing cavity 121. A first end of the housing 100 is provided with a first through-hole 102, and a second end of the housing 100 is provided with a second through-hole 103.

Further, as illustrated in FIGS. 1 and 3, the housing 100 includes a cylindrical member 101 and an end cover 140. The cavity 120 is formed within the cylindrical member. The end cover 140 has a fourth through-hole 141, the outer peripheral wall of the end cover 140 is connected to the inner wall face of the first through-hole 102, and the fourth through-hole 141 is located within the first through-hole 102.

Further, as illustrated in FIGS. 1 and 3, the cylindrical member 101 has a flange 130 located on an outer peripheral face of the cylindrical member 101, and the flange 130 has connection holes 131 arranged at intervals, to enable the housing 100 to be mounted and fixed by the flange 130.

As illustrated in FIG. 1, the material of the shaft 200 is magnetically conductive. The shaft 200 passes through the housing 100 along its axial direction (e.g., an up-down direction in FIG. 1), and is at least partially located within the cavity 120. The axial direction of the shaft 200 is parallel to a length direction of the housing 100 (e.g., the up-down direction in FIG. 1). A first end of the shaft 200 (e.g., a lower end of the shaft 200) extends out of the housing 100 through the fourth through-hole 141, and a second end of the shaft 200 (e.g., an upper end of the shaft 200) extends out of the housing 100 through the second through-hole 103.

Further, as illustrated in FIG. 1, the shaft 200 is rotatable in a circumferential direction of the shaft relative to the housing 100.

As illustrated in FIGS. 1 and 2, the outer peripheral face of the shaft 200 is provided with liquid injection grooves 201; a length direction of the liquid injection groove 201 is parallel to the axial direction of the shaft 200; and an end of the liquid injection groove 201 (e.g., a lower end of the liquid injection groove 201) extends out of the housing 100. The magnetic fluid sealing device according to the embodiments of the present disclosure communicates the sealing cavity 121 with the exterior through the liquid injection grooves 201. Therefore, the magnetic fluid sealing device does not need to be disassembled when the magnetic fluid 820 is injected, and the magnetic fluid 820 can be injected into the sealing cavity 121 using the liquid injection grooves 201.

As illustrated in FIGS. 1 and 2, the magnetic sealing member 300 is located within the sealing cavity 121. The magnetic sealing member 300 includes magnetic sources and pole shoes. There are a plurality of pole shoes and at least one magnetic source. The plurality of pole shoes are arranged at intervals in the length direction of the housing 100, and the magnetic source is connected between two adjacent pole shoes. The outer peripheral face of the pole shoe is in contact with an inner peripheral face of the housing 100, the magnetic source and the pole shoes are both sleeved over the shaft 200. There is a sealing gap 122 between the plurality of pole shoes and the shaft 200, and the sealing gap 122 is in communication with the liquid injection grooves 201. Specifically, the number of the pole shoes is always one more than the number of the magnetic sources. Therefore, a magnetic loop can be generated between the pole shoes, the magnetic source, and the shaft 200. The magnetic fluid 820 can be adsorbed in the sealing gap 122 by a magnetic force in the magnetic loop, thereby ensuring that the sealing gap 122 can be filled evenly and effectively by the magnetic fluid 820.

Specifically, the plurality of pole shoes include a first pole shoe 310, a second pole shoe 320, and a third pole shoe 330, and the at least one magnetic source includes a first magnetic source and a second magnetic source.

Further, the inner peripheral face of the first pole shoe 310 is provided with a plurality of first annular pole teeth 311 arranged at intervals in the up-down direction; the inner peripheral face of the second pole shoe 320 is provided with a plurality of second annular pole teeth 321 arranged at intervals in the up-down direction; the inner peripheral face of the third pole shoe 330 is provided with a plurality of third annular pole teeth 331 arranged at intervals in the up-down direction; and the sealing gap 122 is formed between inner surfaces of respective annular pole teeth of the plurality of pole shoes and the shaft 200.

The magnetic fluid sealing device according to the embodiments of the present disclosure does not need to be disassembled when the magnetic fluid 820 is injected, and the magnetic fluid 820 can directly enter the sealing gap 122 from the liquid injection grooves 201. Therefore, the magnetic fluid 820 can be injected conveniently and quickly, and the sealing gap 122 can be filled evenly and effectively by the magnetic fluid 820.

Figure 4:
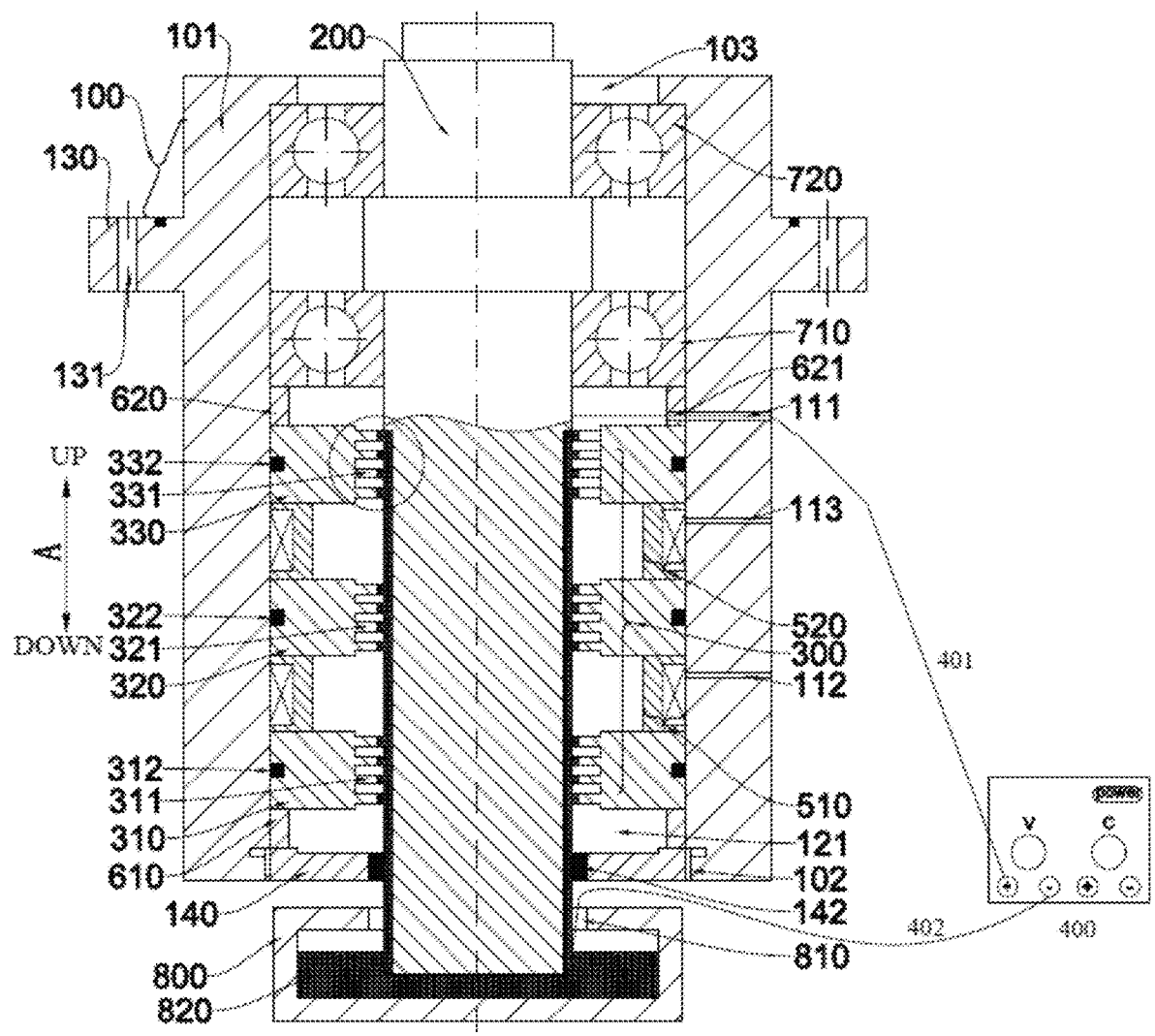
FIG. 4 is a schematic view of magnetic fluid being injected into a magnetic fluid sealing device according to an embodiment of the present disclosure.
Figure 5:
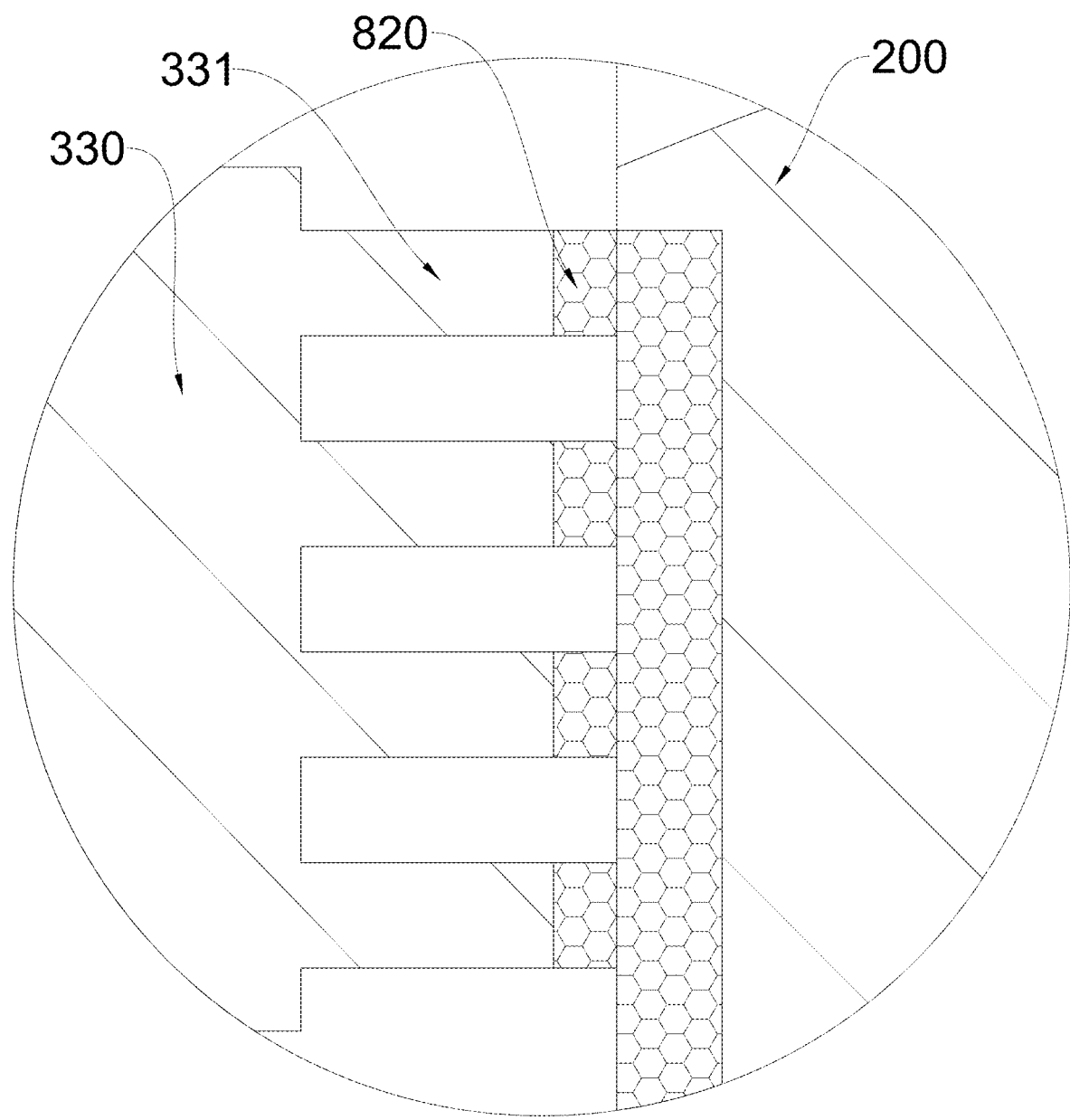
FIG. 5 is a partially enlarged view of FIG. 4.

In some embodiments of the present disclosure, as illustrated in FIGS. 4 and 5, the length direction of the housing 100 is the up-down direction. The magnetic fluid sealing device according to the embodiments of the present disclosure further includes an energizing device 400 and a liquid container 800. The energizing device 400 is connected to the shaft 200 and used to conduct an axial current to the shaft 200 to generate a magnetic field weakened from the inside to the outside in a radial direction of the shaft 200. The liquid container 800 contains the magnetic fluid 820 and is located below the housing 100. The lower end of the shaft 200 extends into the liquid container 800 from a top of the liquid container 800 and is immersed in the magnetic fluid 820. In other words, a liquid level of the magnetic fluid 820 in the liquid container 800 is higher than a lower end face of the shaft 200. The magnetic field can be generated around the shaft 200 after the axial current is conducted through the shaft 200, and the magnetic fluid 820 can climb along the liquid injection grooves 201 and into the sealing gap 122 under the action of the magnetic field.

Specifically, as illustrated in FIGS. 4 and 5, the magnetic field can be generated around the shaft 200 after the axial current is conducted through the shaft 200, and the magnetic fluid 820 is a viscoelastic liquid. The magnetic fluid 820 tends towards a position with stronger magnetic field, and then the magnetic fluid 820 is adsorbed in the liquid injection grooves 201 and attached to a bottom wall face 2011 of the liquid injection grooves 201. Since the lower end of the shaft 200 is immersed in the magnetic fluid 820, under the condition that a lower position near the bottom wall face 2011, where the magnetic field is strongest, has been occupied by the magnetic fluid 820, the magnetic fluid 820 tends an upper position near the bottom wall face 2011 where the magnetic field is strongest under the action of the magnetic field. Since the magnetic fluid 820 is attracted by the magnetic field, the magnetic fluid 820 is attached to the bottom wall face 2011 of the liquid injection groove 201 and will not fall. Thus, the magnetic fluid 820 can climb along the bottom wall face 2011 of the liquid injection grooves 201 and into the sealing gap 122 under the action of the magnetic field. Therefore, for the magnetic fluid sealing device according to the embodiments of the present disclosure, the magnetic fluid 820 can be injected simply and quickly, and the sealing gap 122 can be evenly and effectively filled by the magnetic fluid 820.

Further, as illustrated in FIG. 4, the top of the liquid container 800 has a sixth through-hole 810, and there is a gap between the inner wall face of the sixth through-hole 810 and the outer peripheral face of the shaft 200. The lower end of the shaft 200 extends into the liquid container 800 from the sixth through-hole 810. Therefore, the magnetic fluid 820 in the liquid container 800 can pass through the gap between the inner wall face of the sixth through-hole 810 and the outer peripheral face of the shaft 200 and climb upwards along the bottom wall face 2011 of the liquid injection grooves 201, so as to be injected into the sealing gap 122.

Further, as illustrated in FIG. 4, the outer peripheral face of the housing 100 is provided with the third through-hole 111 in communication with the cavity 120. The energizing device 400 is connected to the shaft 200 through a first wire 401 and a second wire 402. The first wire 401 passes through the third through-hole 111 and is connected to the shaft 200 above the magnetic sealing member 300. The second wire 402 extends into the liquid container 800 through the sixth through-hole 810 and is connected to the shaft 200 at the lower end of the shaft 200. Therefore, the magnetic fluid sealing device according to the embodiments of the present disclosure can generate an effective magnetic field around the shaft 200, thus the magnetic fluid 820 can successfully climb upwards into the sealing gap 122 along the bottom wall face 2011 of the liquid injection grooves 201.

Further, the energizing device 400 can change the magnitude of the current through the shaft 200, and thus change the intensity of the magnetic field generated around the shaft 200. The higher the intensity of the magnetic field, the greater an absorption force exerted on the magnetic fluid 820. Thus, more magnetic fluid 820 can be adsorbed on the bottom wall face 2011 of the liquid injection groove 201, and the upward climbing speed of the magnetic fluid 820 is also greater. Therefore, the magnetic fluid sealing device according to the embodiments of the present disclosure can adjust the injection speed of the magnetic fluid 820 based on the magnitude of the current flowing through the shaft 200 by the energizing device 400.

Further, the magnetic fluid sealing device according to the embodiments of the present disclosure can control the amount of the magnetic fluid 820 injected into the sealing gap 122 based on the injection speed and injection time of the magnetic fluid 820. Since the magnetic fluid 820 is the viscoelastic liquid, the larger the amount of the magnetic fluid 820 in the sealing gap 122 is, the stronger the pressure resistance is, but at the same time the greater the resistance to the start of the shaft 200 is. Therefore, the magnetic fluid sealing device according to the embodiments of the present disclosure can balance the pressure resistance of the magnetic fluid 820 in the sealing gap 122 and the resistance to the start of the shaft 200 based on the injection amount of the magnetic fluid 820.

Further, as illustrated in FIG. 4, a sealing ring can be provided within the fourth through-hole 141 and sleeved over the shaft 200, so as to seal the cavity 120 within the housing 100. Specifically, the outer peripheral wall of the sealing ring 142 is connected to the inner wall face of the fourth through-hole 141, and the inner wall face of the sealing ring 142 is in clearance fit with the outer peripheral face of the shaft 200.

Further, the liquid injection grooves 201 have rectangular cross-sections. Therefore, it is convenient for the magnetic fluid to enter the liquid injection grooves 201 from the liquid container 800, and it is also convenient for the magnetic fluid 820 to enter the sealing gap 122 from the liquid injection grooves 201. It can be understood that the cross-sections of the liquid injection grooves 201 can also be in other shapes under the premise that the injection of the magnetic fluid 820 into the sealing gap 122 is not affected.

In some embodiments, as illustrated in FIGS. 6 to 9, the magnetic fluid sealing device according to the embodiments of the present disclosure further includes a connecting member 900. The connecting member 900 includes a first portion 910 and a second portion 920. The second portion 920 is located within the liquid injection grooves 201, and the first portion 910 is connected to the second portion 920 and the shaft 200. Specifically, the first portion 910 is located outside the hosing 100, and the housing 100 is sleeved over the shaft 200. The cross-sections of the second portion 920 are the same as the cross-sections of the liquid injection grooves 201. The second portion 920 is embedded in the liquid injection grooves 201, and the inner wall face 921 of the second portion 920 is in contact with the bottom wall face 2011 of the liquid injection grooves 201. The connecting member 900 is mounted on the shaft 200 through the first portion 910 after being embedded in the liquid injection groove 201. Therefore, after the magnetic fluid 820 is injected into the magnetic fluid sealing device according to the embodiments of the present disclosure, the second portion 920 is used to block the liquid injection grooves 201, and thereby the magnetic loop can be better formed among the magnetic sources, the pole shoes, the magnetic fluid 820, and the shaft 200.

Figure 7:
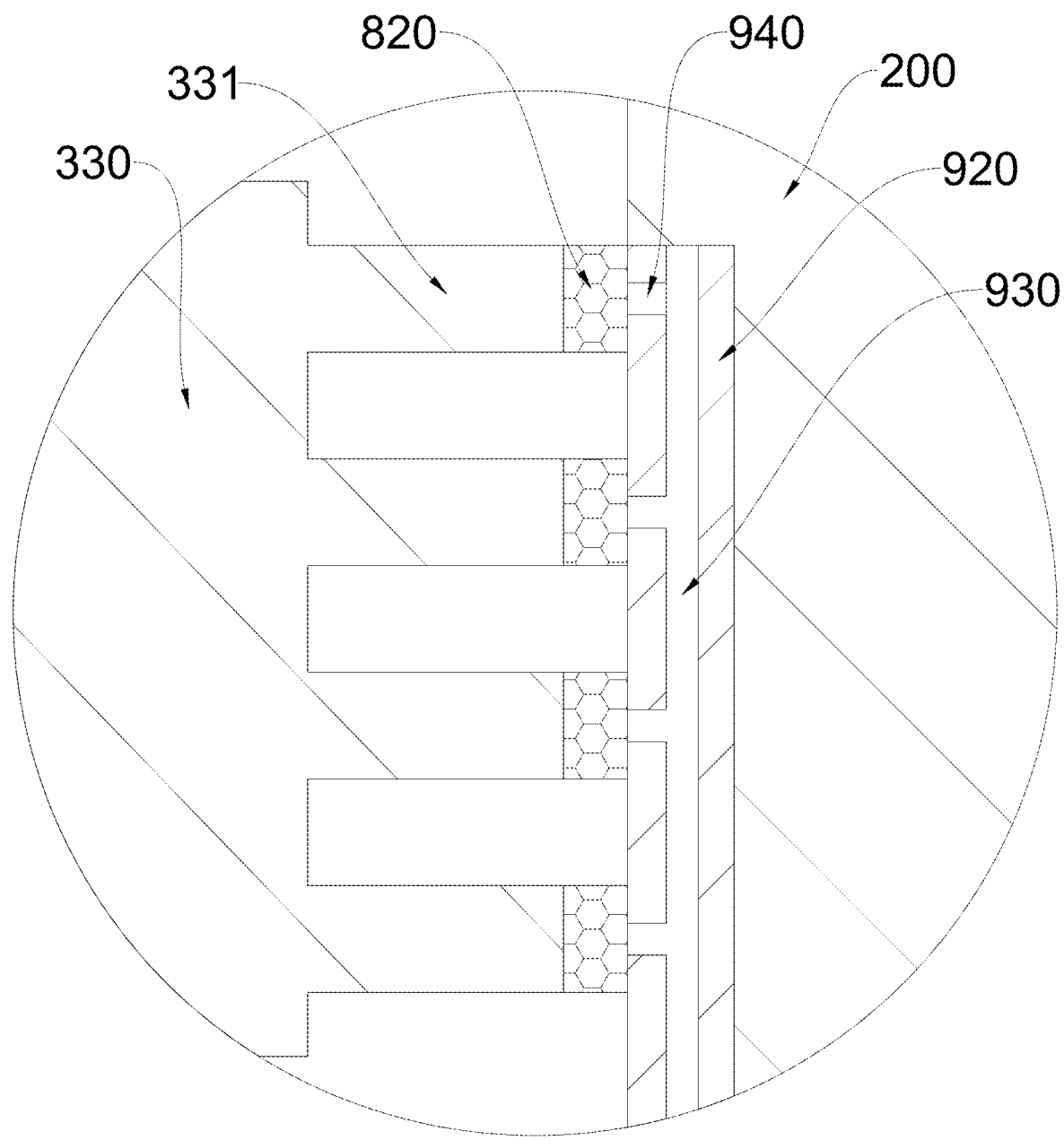
FIG. 7 is a partially enlarged view of FIG. 6.
Figure 8:
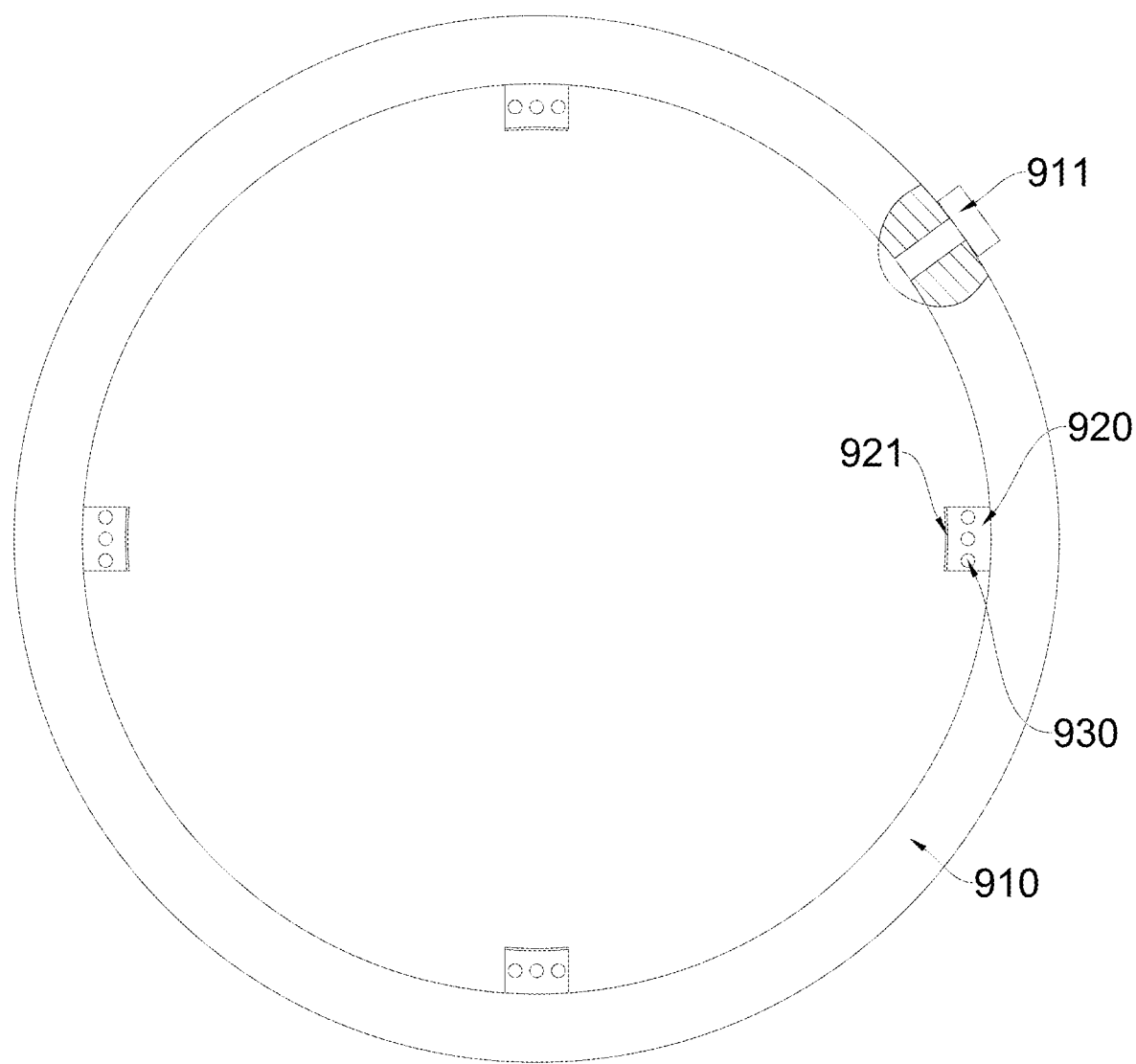
FIG. 8 is an exemplary schematic view of the connecting member of a magnetic fluid sealing device according to an embodiment of the present disclosure.

Further, as illustrated in FIGS. 7 and 8, the second portion 920 has a first channel 930, and a length direction of the first channel 930 is parallel to the axial direction of the shaft 200.

Heat is mainly generated at the sealing gap 122 when the magnetic fluid sealing device according to embodiments of the present disclosure works, and such a problem will be aggravated when the shaft 200 rotates at a high speed. Since the second portion 920 and the first channel 930 are close to the sealing gap 122, the first channel 930 can provide a heat-dissipating channel for the magnetic fluid sealing device according to the embodiments of the present disclosure. Specifically, the first channel 930 runs through the second portion 920 along a length direction of the second portion 920, that is, the first channel 930 is in communication with the exterior, and at the same time a contact area with the shaft 200 can be increased. Therefore, the heat at the sealing gap 122 can be directly discharged to the exterior through the first channel 930, and a heat dissipation effect can be enhanced.

In some embodiments, the inner wall face 921 of the second portion is a tapered face with a certain taper. Therefore, the inner wall face 921 of the second portion can abut tightly against the bottom wall face 2011 at the lower end of the liquid injection grooves 201, without affecting installation of the second portion 920 into the liquid injection grooves 201.

Figure 9:
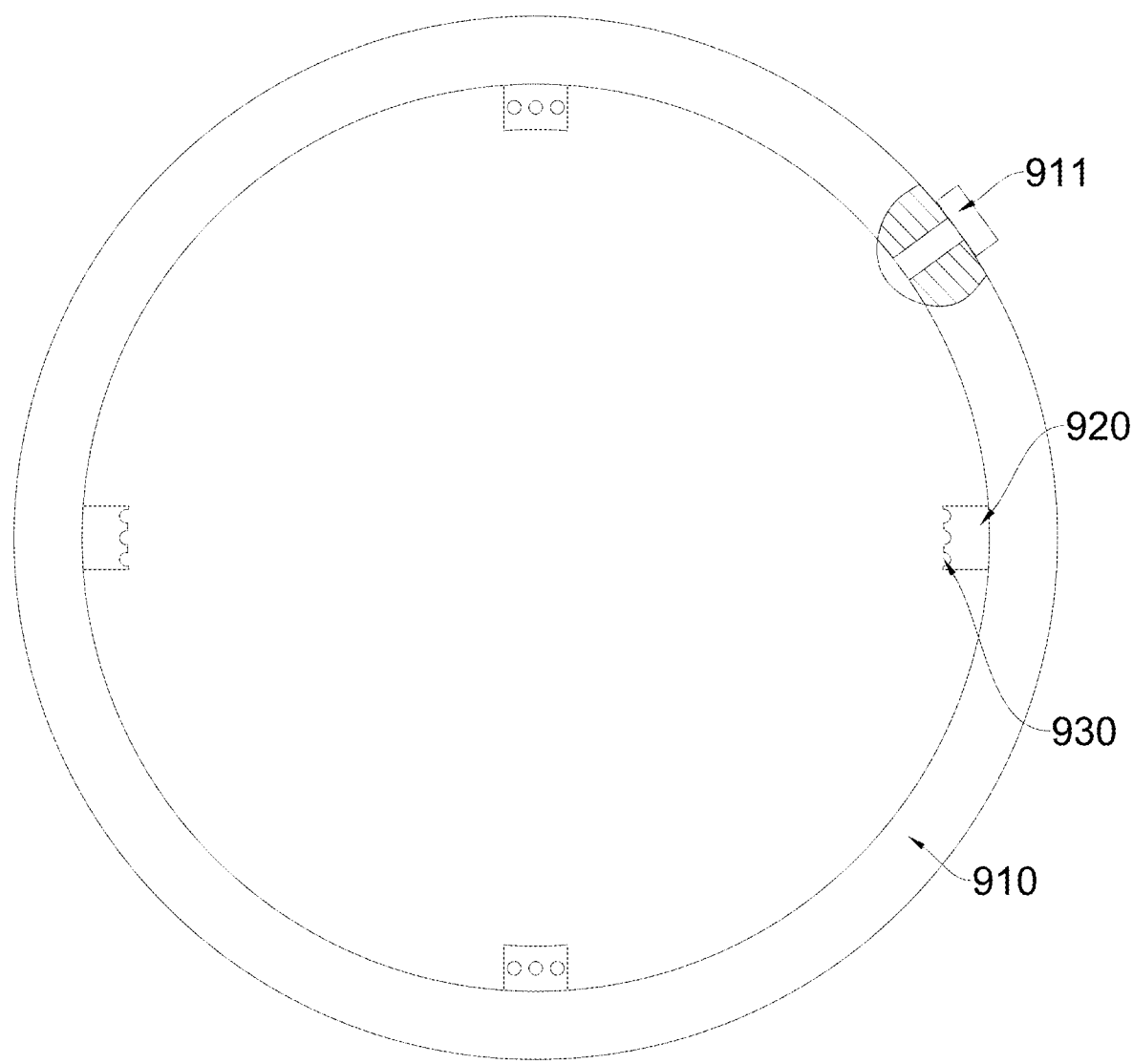
FIG. 9 is another exemplary schematic view of the connecting member of a magnetic fluid sealing device according to an embodiment of the present disclosure.

Further, as illustrated in FIG. 9, the first channel 930 is provided in the inner wall face 921 of the second portion 920. That is, the first channel 930 is a through groove opened in the inner wall face 921 of the second portion. In other words, a side of the first channel 930 has a breach on the inner wall face 921 of the second portion. Thereby, machining and manufacturing difficulties of the second portion can be reduced greatly.

In some embodiments, as illustrated in FIG. 8, the second portion 920 also has a second channel 940. At least one second channel 940 is provided, and is in communication with the first channel 930 and the sealing gap 122. In other words, the first channel 930 is directly in communication with the sealing gap 122 through the second channel 940. Therefore, the magnetic fluid sealing device according to the embodiments of the present disclosure can radiate the heat at the sealing gap 122 to the exterior directly through the second channel 940 and the first channel 930, and the heat dissipation effect can be improved.

In some embodiments, at the sealing gap where each annular pole tooth is in contact with the second portion 920, there is at least one second channel correspondingly, and the heat dissipation effect can be improved.

It can be understood that in the magnetic fluid sealing device according to the embodiments of the present disclosure, an end of the connecting member 930 close to the first portion 910 can be closed to prevent the magnetic fluid 820 from leaking to the exterior through the first channel 930. The end of the first channel 930 close to the first portion 910 can also penetrate the second portion 920, and the magnetic fluid 820 in the sealing gap 122 can be adsorbed in the sealing gap 122 under the action of the magnetic force, which can prevent the magnetic fluid 820 from leaking to the exterior through the first channel 930.

Figure 6:
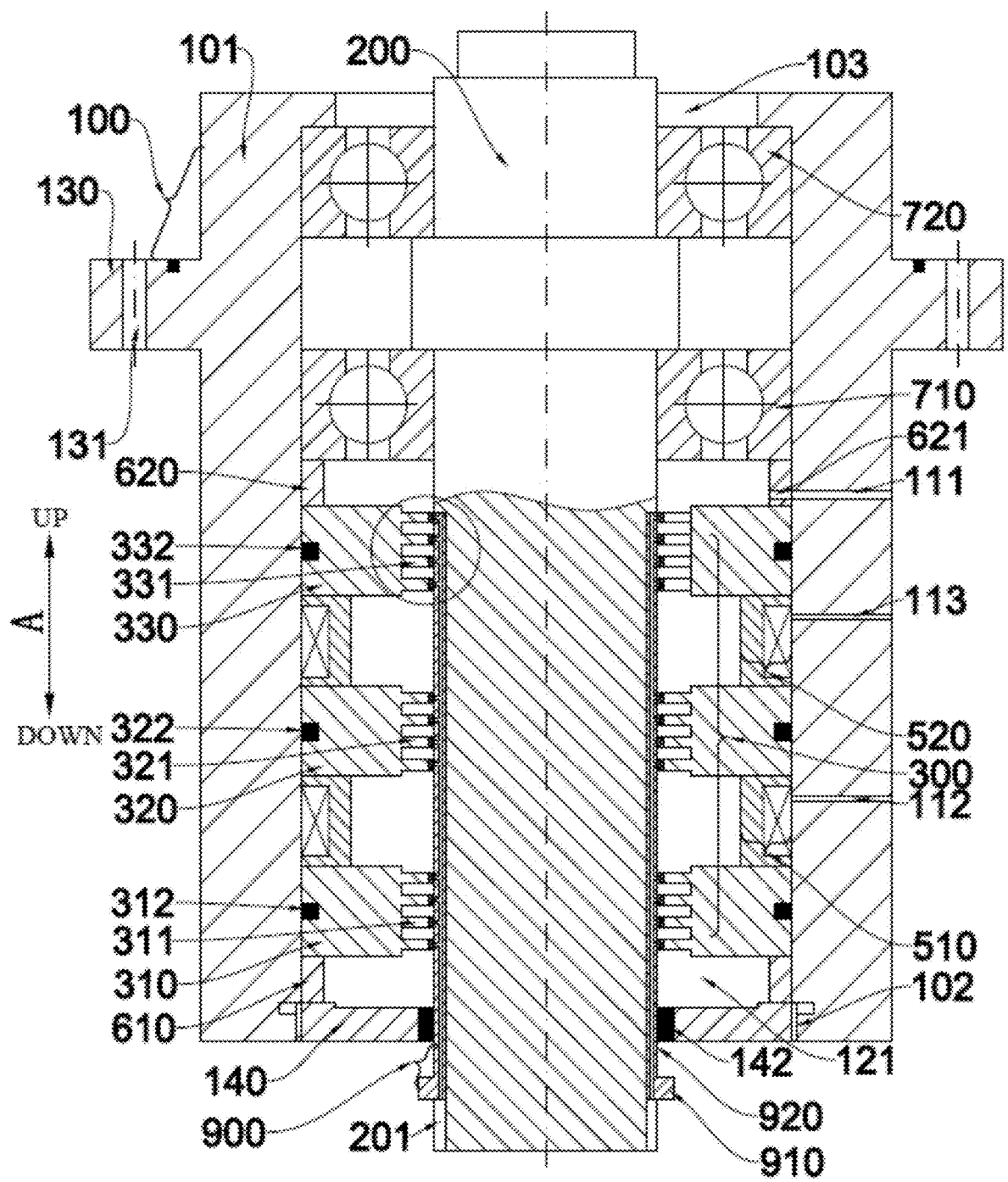
FIG. 6 is a schematic view of a magnetic fluid sealing device according to another embodiment of the present disclosure.

In some embodiments, as illustrated in FIGS. 1, 4, and 6, the magnetic source is an electromagnet. Specifically, the magnetic source includes a first electromagnet 510 and a second electromagnet 520. The first electromagnet 510 and the second electromagnet 520 are connected to a power supply device through wires. The power supply device can adjust the magnitude of current supplied to the electromagnets, and in turn adjust the intensity of the magnetic field generated by the electromagnets. The viscosity of the magnetic fluid 820 in the sealing gap 122 can change according to the intensity of the magnetic field. Therefore, the magnetic fluid sealing device according to the embodiments of the present disclosure can reduce the intensity of the magnetic field generated by the electromagnets though the power supply device when the shaft 200 is started, such that the shaft 200 can be started successfully. The magnetic fluid sealing device according to the embodiments of the present disclosure can increase the intensity of the magnetic field generated by the electromagnets through the power supply device after the shaft 200 is started, such that the pressure resistance of the sealing liquid in the sealing gap 122 can be ensured. At the same time, when the magnetic fluid 820 is injected, injection difficulty of the magnetic fluid 820 can be reduced by adjusting the current of the electromagnets.

Further, as illustrated in FIGS. 1, 4, and 6, the outer peripheral face of the housing 100 is provided with a via-hole in communication with the sealing cavity 121, and the wire connecting the electromagnet and the power supply device can pass through the via-hole. Specifically, the number of the via-holes is at least identical to the number of the electromagnets. When there are two electromagnets, the via-hole includes a first via-hole 112 and a second via-hole 113.

Further, sealing between an inner wall face of the via-hole and the wire is achieved by a sealant or other sealing methods after the wire passes through the via-hole, to prevent external contaminants from entering the sealing cavity 121.

In some embodiments, the inner peripheral face of each pole shoe is provided with a plurality of annular pole teeth arranged at intervals along the axial direction of the shaft 200, and the sealing gap 122 is formed between inner surfaces of the plurality of annular pole teeth of the pole shoe and the shaft 200. As illustrated in FIG. 1, the annular pole teeth are arranged on the inner peripheral face of the pole shoe and spaced apart in the up-down direction, and the sealing gap 122 is formed between the annular pole teeth and the shaft 200. The gap between the annular pole teeth and the shaft 200 is small, the gradient of the magnetic field in the sealing gap 122 is strong, and the magnetic fluid 820 is adsorbed in the sealing gap 122 by the magnetic force.

In some embodiments, the magnetic fluid sealing device further includes a sealing ring. There are a plurality of sealing rings, and the outer peripheral face of each pole shoe is provided with an annular groove. The sealing ring is fitted in the annular groove, and the sealing ring is in contact with the inner peripheral face of the housing 100. Thus, the sealing ring can achieve static sealing of the outer wall of the pole shoe and the interior of the housing.

Further, as illustrated in FIG. 1, the plurality of sealing rings includes a first sealing ring 312, a second sealing ring 322, and a third sealing ring 332. The outer peripheral face of the first pole shoe 310 is provided with a first annular groove, and the first sealing ring 312 is fitted in the first annular groove and is in contact with the inner peripheral face of the housing 100. The outer peripheral face of the second pole shoe 320 is provided with a second annular groove, and the second sealing ring 322 is fitted in the second annular groove and is in contact with the inner peripheral face of the housing 100. The outer peripheral face of the third pole shoe 330 is provided with a third annular groove, and the third sealing ring 332 is fitted in the third annular groove and is in contact with the inner peripheral face of the housing 100.

In some embodiments, the magnetic fluid sealing device also includes a first magnetic isolation ring 610 and a second magnetic isolation ring 620. The first magnetic isolation ring 610 and the second magnetic isolation ring 620 are arranged within the sealing cavity 121 and spaced apart along the axial direction of the shaft 200. Gaps exist between the first and second magnetic isolation rings 610, 620 and the shaft 200. The outer peripheral face of the first magnetic isolation ring 610 and the outer peripheral face of the second magnetic isolation ring 620 are in contact with the inner peripheral face of the housing 100. The magnetic sealing member 300 is arranged between the first magnetic isolation ring 610 and the second magnetic isolation ring 620.

As illustrated in FIG. 1, the first magnetic isolation ring 610 and the second magnetic isolation ring 620 are spaced apart in the up-down direction, and the magnetic sealing member 300 is located between the first magnetic isolation ring 610 and the second magnetic isolation ring 620. The first magnetic isolation ring 610 and the second magnetic isolation ring 620 can prevent the leakage of the magnetic loop and stabilize the gradient of the magnetic field in the sealing gap 122.

Further, the second magnetic isolation ring 620 has a fifth through-hole 621 in communication with the third through-hole 111 and the sealing cavity 121. Therefore, there is no need to leave space for communicating the sealing cavity 121 with the third through-hole 111 in the sealing cavity 121, and the size of the magnetic fluid sealing device in the length direction (e.g., the up-down direction in FIG. 1) can be reduced.

In some embodiments, the magnetic fluid sealing device also includes a first bearing 710 and a second bearing 720. The first bearing 710 and the second bearing 720 are both located within the cavity 120 and sleeved over the shaft 200. The outer peripheral face of the first bearing 710 and the outer peripheral face of the second bearing 720 are both in contact with the inner peripheral face of the housing 100.

As illustrated in FIG. 1, the second magnetic isolation ring 620 is located between the magnetic sealing member 300 and the first bearing 710, and the first bearing 710 is located between the second magnetic isolation ring 620 and the second bearing 720. That is, the magnetic sealing member 300 is located at one side of the second magnetic isolation ring 620, and the first bearing 710 and the second bearing 720 are located at the other side of the second magnetic isolation ring 620. Specifically, the sealing gap 122 is formed between the first bearing 710 and the end cover 140.

The magnetic fluid sealing device according to some specific examples of the present disclosure will be described below with reference to the drawings.

As illustrated in FIGS. 1 to 3, the magnetic fluid sealing device according to an embodiment of the present disclosure includes a housing 100, a shaft 200, a magnetic sealing member 300, a sealing ring, a first magnetic isolation ring 610, a second magnetic isolation ring 620, a first bearing 710, and a second bearing 720.

The material of the housing 100 is magnetically non-conductive. The housing 100 has a cavity 120 including a sealing cavity 121, and magnetic fluid 820 fills the sealing cavity 121. A lower end of the housing 100 is provided with a first through-hole 102, and an upper end of the housing 100 is provided with a second through-hole 103. The outer peripheral face of the housing 100 is provided with a third through-hole 111 in communication with the cavity 120. The housing 100 includes a cylindrical member 101 and an end cover 140. The cavity 120 is formed within the cylindrical member. The end cover 140 has a fourth through-hole 141; the outer peripheral wall of the end cover 140 is connected to the inner wall face of the first through-hole 102; and the fourth through-hole 141 is located within the first through-hole 102. The cylindrical member 101 has a flange 130 located on the outer peripheral face of the cylindrical member 101. The flange 130 has connection holes 131 arranged at intervals, so that the housing 100 can be mounted and fixed by the flange 130. A sealing ring 142 can be provided in the fourth through-hole 141 and sleeved over the shaft 200, so as to seal the cavity 120 within the housing 100.

The shaft 200 is rotatable in a circumferential direction of the shaft relative to the housing 100, and the material of the shaft 200 is magnetically conductive. The shaft 200 passes through the housing 100 along an up-down direction, and is at least partially located within the cavity 120. The lower end of the shaft 200 extends out of the housing 100 through the fourth through-hole 141, and the upper end of the shaft 200 extends out of the housing 100 through the second through-hole 103.

As illustrated in FIGS. 1 and 2, the outer peripheral face of the shaft 200 is provided with a liquid injection groove 201, and a cross-section of the liquid injection groove 201 is rectangular. A length direction of the liquid injection groove 201 is parallel to the up-down direction, and a lower end of the liquid injection groove 201 extends out of the housing 100.

As illustrated in FIGS. 1 and 2, the magnetic sealing member 300 is located within the sealing cavity 121. The magnetic sealing member 300 includes a first electromagnet 510, a second electromagnet 520, a first pole shoe 310, a second pole shoe 320, and a third pole shoe 330. The first pole shoe 310, the second pole shoe 320, and the third pole shoe 330 are arranged at intervals in the up-down direction. The first electromagnet 510 is connected between the first pole shoe 310 and the second pole shoe 320, and the second electromagnet 520 is connected between the second pole shoe 320 and the third pole shoe 330.

As illustrated in FIG. 1, the inner peripheral face of the first pole shoe 310 is provided with a plurality of first annular pole teeth 311 arranged at intervals in the up-down direction; the inner peripheral face of the second pole shoe 320 is provided with a plurality of second annular pole teeth 321 arranged at intervals in the up-down direction; the inner peripheral face of the third pole shoe 330 is provided with a plurality of third annular pole teeth 331 arranged at intervals in the up-down direction; and a sealing gap 122 is formed between inner surfaces of the first annular pole teeth 311, the second annular pole teeth 321 and the third annular pole teeth 331 and the shaft 200.

As illustrated in FIG. 1, the outer peripheral face of the housing 100 is provided with a first via-hole 112 and a second via-hole 113 in communication with the sealing cavity 121. A wire connecting the first electromagnet 510 and the power supply device can pass through the first via-hole 112, and a wire connecting the second electromagnet 520 and the power supply device can pass through the second via-hole 113.

Further, after the wires pass through the first via-hole 112 and the second via-hole 113, sealing between the inner wall face of the first via-hole 112 and the wire is achieved by a sealant or other sealing methods, and sealing between the inner wall face of the second via-hole 113 and the wire is achieved by a sealant or other sealing methods.

As illustrated in FIG. 1, a plurality of sealing rings include a first sealing ring 312, a second sealing ring 322, and a third sealing ring 332. The outer peripheral face of the first pole shoe 310 is provided with a first annular groove, and the first sealing ring 312 is fitted in the first annular groove and is in contact with the inner peripheral face of the housing 100. The outer peripheral face of the second pole shoe 320 is provided with a second annular groove, and the second sealing ring 322 is fitted in the second annular groove and is in contact with the inner peripheral face of the housing 100. The outer peripheral face of the third pole shoe 330 is provided with a third annular groove, and the third sealing ring 332 is fitted in the third annular groove and is in contact with the inner peripheral face of the housing 100.

As illustrated in FIG. 1, the first magnetic isolation ring 610 and the second magnetic isolation ring 620 are arranged within the sealing cavity 121 and spaced apart in the up-down direction. Gaps exist between the first and second magnetic isolation rings 610, 620 and the shaft 200. The outer peripheral face of the first magnetic isolation ring 610 and the outer peripheral face of the second magnetic isolation ring 620 are in contact with the inner peripheral face of the housing 100. The magnetic sealing member 300 is arranged between the first magnetic isolation ring 610 and the second magnetic isolation ring 620.

As illustrated in FIG. 1, the first bearing 710 and the second bearing 720 are both located within the cavity 120 and sleeved over the shaft 200. The outer peripheral face of the first bearing 710 and the outer peripheral face of the second bearing 720 are both in contact with the inner peripheral face of the housing 100. The first bearing 710 and the second bearing 720 are both located above the magnetic sealing member 300.

As illustrated in FIGS. 6 to 9, the magnetic fluid sealing device according to another embodiment of the present disclosure also includes a connecting member 900.

The connecting member 900 includes a first portion 910 and a second portion 920. The second portion 920 is embedded within the liquid injection groove 201, and the first portion 910 is integrally connected to the second portion 920. The first portion 910 is sleeved over the shaft 200 and connected to the shaft 200 by a screw 911. The second portion 920 has a first channel 930 and a second channel 940. A length direction of the first channel 930 is parallel to the up-down direction, and the first channel 930 is arranged in an inner wall face 921 of the second portion 920. A plurality of second channels 940 are provided and are in communication with the first channel 930 and the sealing gap 122.

In the description of the present disclosure, relative terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," "circumferential" and the like should be constructed to refer to the orientation or position as then described or as shown in the drawings under discussion. These relative terms are for convenience and simplification of description and do not indicate or imply that the device or element referred to must have a particular orientation, or be constructed and operated in a particular orientation, so these terms shall not be construed to limit the present disclosure.

Furthermore, terms "first," "second," are used for descriptive purpose only, and cannot be construed to indicate or imply relative importance or implicitly indicate the number of technical features indicated. Therefore, the features defined "first," "second," can explicitly or implicitly include at least one of the features. In the description of the present disclosure, "a plurality of" means at least two, for example, two, three, and the like, unless specified or limited otherwise.

In the descriptions, unless specified or limited otherwise, the terms "mounted," "connected," "coupled," and "fixed"

and variations thereof should be understood broadly. For example, these may be permanent connections, detachable connections or integrated; mechanical connections, electrical connections or communicated with each other; direct connections or indirect connections via intervening structures; inner communication or interaction of two elements, unless specified or limited otherwise. Those skilled in the related art may understand specific meanings of the above terms in the present disclosure according to specific situations.

In the present disclosure, unless specified or limited otherwise, a structure in which a first feature is "on" or "below" a second feature may include an embodiment in which the first feature is in direct contact with the second feature, and may also include an embodiment in which the first feature is in indirect contact with the second feature through intermediaries. Furthermore, a first feature "on," "above," or "on top of" a second feature may include an embodiment in which the first feature is right "on," "above," or "on top of" the second feature, and may also include an embodiment in which the first feature is diagonally "on," "above," or "on top of" the second feature, or just means that the first feature is at a height higher than that of the second feature. A first feature "beneath," "below," or "on bottom of" a second feature may include an embodiment in which the first feature is right "beneath," "below," or "on bottom of" the second feature, and may also include an embodiment in which the first feature is diagonally "beneath," "below," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the related art may combine and incorporate different embodiments or examples and their features described in the specification, without mutual contradictions.

Although explanatory embodiments have been illustrated and described, it would be appreciated by those skilled in the art that the above embodiments cannot be construed to limit the present disclosure, and changes, alternatives, modifications and variations can be made in the embodiments without departing from the scope of the present disclosure.

What is claimed is:

1. A magnetic fluid sealing device, comprising:
   a housing made of a magnetically non-conductive material and having a cavity, wherein an end of the housing is provided with a first through-hole, the cavity comprises a sealing cavity, and the sealing cavity contains magnetic fluid;
   a shaft made of a magnetically conductive material, passing through the housing along an axial direction of the shaft, and at least partially located within the cavity, wherein the axial direction of the shaft is parallel to a length direction of the housing, an end of the shaft extends out of the housing through the first through-hole, an outer peripheral face of the shaft is provided with liquid injection grooves, a length direction of each liquid injection groove is parallel to the axial direction of the shaft, and an end of each liquid injection groove extends out of the housing; and
   a magnetic sealing member located within the sealing cavity and comprising at least one magnetic source and a plurality of pole shoes, wherein the plurality of pole shoes are arranged at intervals in the length direction of the housing, the magnetic source is connected between two adjacent pole shoes, an outer peripheral face of each pole shoe is in contact with an inner peripheral face of the housing, the magnetic source and the pole shoes are sleeved over the shaft, a sealing gap is provided between the plurality of pole shoes and the shaft and is in communication with the liquid injection grooves, and the magnetic fluid is adapted to be adsorbed in the sealing gap under the action of a magnetic force;
   wherein the length direction of the housing is an up-down direction; the magnetic fluid sealing device further comprises an energizing device and a liquid container; the energizing device is connected to the shaft and used to conduct an axial current through the shaft to generate a magnetic field weakened from inside to outside in a radial direction of the shaft; the magnetic fluid is contained in the liquid container; the liquid container is located below the housing; a lower end of the shaft extends into the liquid container from a top of the liquid container and is immersed in the magnetic fluid; and the magnetic fluid is adapted to climb along the liquid injection grooves and into the sealing gap under the action of the magnetic field.

2. The magnetic fluid sealing device according to claim 1, further comprising a connecting member, wherein the connecting member comprises a first portion and a second portion connected to the first portion, the second portion is embedded in the liquid injection grooves, and the first portion is connected to the second portion and the shaft, wherein the connecting member is mounted on the shaft through the first portion after the magnetic fluid is injected into the magnetic fluid sealing device.

3. The magnetic fluid sealing device according to claim 2, wherein the second portion has a first channel close to the sealing gap, and a length direction of the first channel is parallel to the axial direction of the shaft, wherein the first channel is configured as a heat-dissipating channel for the magnetic fluid sealing device.

4. The magnetic fluid sealing device according to claim 3, wherein the second portion further has at least one second channel in communication with the first channel and the sealing gap.

5. The magnetic fluid sealing device according to claim 3, wherein the first channel is arranged in an inner wall face of the second portion.

6. The magnetic fluid sealing device according to claim 1, wherein the magnetic source comprises an electromagnet adapted to be connected to a power supply device through a wire.

7. The magnetic fluid sealing device according to claim 1, wherein an inner peripheral face of each pole shoe is provided with a plurality of annular pole teeth arranged at intervals along the axial direction of the shaft, and the sealing gap is formed between inner surfaces of the annular pole teeth of the plurality of pole shoes and the shaft.

8. The magnetic fluid sealing device according to claim 1, further comprising a first magnetic isolation ring and a second magnetic isolation ring that are provided within the sealing cavity and spaced apart along the axial direction of the shaft, wherein gaps are defined between the first and second magnetic isolation rings and the shaft, an outer peripheral face of the first magnetic isolation ring and an outer peripheral face of the second magnetic isolation ring are in contact with the inner peripheral face of the housing, and the magnetic sealing member is arranged between the first magnetic isolation ring and the second magnetic isolation ring.

9. The magnetic fluid sealing device according to claim 1, further comprising a first bearing and a second bearing that are located within the cavity and sleeved over the shaft, wherein an outer peripheral face of the first bearing and an outer peripheral face of the second bearing are both in contact with the inner peripheral face of the housing.

\* \* \* \* \*